United States Patent
Mogck et al.

(10) Patent No.: US 7,478,470 B2
(45) Date of Patent: Jan. 20, 2009

(54) DEVICE FOR ASSEMBLING, TUNING, AND TESTING MOTOR VEHICLES

(75) Inventors: Gerhard Mogck, Untergruppenbach (DE); Frédéric De Moliere, Mühltal (DE); Klaus Werner Thomer, Nieder-Olm (DE); Thomas Tentrup, Mechern (DE)

(73) Assignee: Dürr Aktiengesellschaft, Stuttgart (DE)

( * ) Notice: Subject to any disclaimer, the term of this patent is extended or adjusted under 35 U.S.C. 154(b) by 0 days.

(21) Appl. No.: 10/538,082

(22) PCT Filed: Dec. 2, 2003

(86) PCT No.: PCT/DE03/03982

§ 371 (c)(1),
(2), (4) Date: Oct. 17, 2005

(87) PCT Pub. No.: WO2004/052715

PCT Pub. Date: Jun. 24, 2004

(65) Prior Publication Data

US 2006/0150394 A1    Jul. 13, 2006

(30) Foreign Application Priority Data

Dec. 8, 2002  (DE) ............... 102 57 419
Apr. 8, 2003  (DE) ............... 103 16 273

(51) Int. Cl.
*B23P 23/00* (2006.01)

(52) U.S. Cl. .......... 29/564.1; 29/560; 29/791; 29/822; 29/430; 198/860.2; 198/465.4; 198/687.1

(58) Field of Classification Search ............ 29/564.1, 29/564, 564.7, 33 K, 33 P, 783, 791, 822, 29/560, 429, 430, 431; 198/465.1, 860.2, 198/861.1, 861.2, 465.4, 687.1, 678.1, 681, 198/950

See application file for complete search history.

(56) References Cited

U.S. PATENT DOCUMENTS

| 6,604,279 | B2* | 8/2003 | Kurtz ............... 29/705 |
| 7,082,677 | B2* | 8/2006 | Pellerin et al. ........ 29/802 |
| 2001/0015003 | A1 | 8/2001 | Kurtz |
| 2005/0022587 | A1* | 2/2005 | Tentrup et al. ........ 73/116 |
| 2006/0231371 | A1* | 10/2006 | Moliere et al. ...... 198/341.09 |

FOREIGN PATENT DOCUMENTS

| AT | 347333 | 12/1978 |
| DE | 36 12 118 | 10/1987 |
| DE | 43 09 501 | 9/1994 |
| DE | 44 42 155 | 5/1998 |
| DE | 198 58 989 | 6/2000 |

(Continued)

OTHER PUBLICATIONS

International Search Report.

*Primary Examiner*—Erica E Cadugan
(74) *Attorney, Agent, or Firm*—Collard & Roe, P.C.

(57) ABSTRACT

A device for assembling, tuning and testing motor vehicles may be installed anywhere in a flat hall without modifying the ceiling or floor and is transportable. The device may be assembled from individual, transportable, modular, interconnectable components that can be installed on a flat surface without using pits or creating floor load. The device encompasses the conveying mechanisms and assembly units for the motor vehicles to be assembled.

6 Claims, 11 Drawing Sheets

FOREIGN PATENT DOCUMENTS

| | | |
|---|---|---|
| DE | 199 11 861 | 9/2000 |
| DE | 201 11 684 | 7/2001 |
| DE | 202 11 623 | 1/2003 |
| EP | 1 059 222 | 12/2000 |
| EP | 1 424 268 | 6/2004 |
| GB | 1513877 A * | 6/1978 |
| JP | 2-179571 A * | 7/1990 |
| JP | 8-276323 A * | 10/1996 |
| JP | 2000-158251 A * | 6/2000 |
| WO | WO 02/04279 | 1/2002 |

* cited by examiner

DEVICE FOR ASSEMBLING, TUNING, AND TESTING MOTOR VEHICLES

CROSS REFERENCE TO RELATED APPLICATIONS

Applicants claim priority under 35 U.S.C. §119 of German Application No. 102 57 419.7 filed on Dec. 8, 2002 and German Application No. 103 16 273.9 filed on Apr. 8, 2003. Applicants also claim priority under 35 U.S.C. §365 of PCT/DE2003/003982 filed on Dec. 2, 2003. The international application under PCT article 21(2) was not published in English.

The invention relates to a device for assembling, tuning and testing motor vehicles.

Automobile factories are provided with assembly lines, along which components are delivered to an automobile under production, are assembled and, if necessary, further processed by humans or robots. At the end of the assembly lines, the automobiles under production are continuously advanced on wheels by means of apron conveyors with chain, rope or belt drives, or on skillet conveyors or suspended in an overhead conveyance system. These apron conveyors or skillet systems may be embedded in the floor and may engage either the left, the right or all the wheels of the automobile. If only one apron conveyor is used, the automobile rolls on the other two wheels.

The DE 199 11 861 C2 describes a conveyor belt for vehicle final-assembly lines, which has, at the exit end, a transfer section that connects the conveyor belt to a downstream transport route. The conveyor belt not only includes a simple and hence reliably functioning sweeper for small parts, but also forms a safety mechanism that is triggered if, for example, a worker traveling on the conveyor gets a foot caught between the conveyor and the transfer section.

The DE 198 58 989 A1 describes an assembly and/or transport conveyor for the assembly or transport of motor vehicles, which comprises individual supporting units each of which is mounted movably and is designed to accommodate one motor vehicle. The fact that the supporting units are engineered and arranged one behind the other in such manner that the conveyor forms an endless conveyor enhances the safety and reduces assembly costs.

The DE 201 11 684 U1 describes a device for transporting motor vehicles during final assembly, where the vehicles, with fitted and inflated front and rear tires, are supported on synchronously movable transport conveyor systems that each have bearing surfaces corresponding at least in part to the treads of the tires inflated to test pressure.

The DE 44 42 155 A1 describes a process for the final assembly or dismantling of motor vehicles, in which, after passing through one or two assembly stations, the motor vehicles to be assembled are transported up or down a level to the next assembly station The DE 43 09 501 A1 describes a facility for the final assembly of automobiles, in which a guide rail of an electric telpher system runs along a rework line. Telphers mounted on the telpher line are each connected via a tow bar with a floor vehicle for transporting an automobile.

All these known conveying mechanisms have the disadvantage that they have to be mounted on the ceiling of the assembly hall and/or require pits in the floor of the hall. For ceiling-mounted conveyor systems it is often necessary to reinforce the ceiling statics in the suspension area, which is equally time-consuming and expensive as the provision of pits along the assembly line. With these systems, it is not possible to rearrange assembly lines fast and flexibly within the hall or to move them to a new production location. Another disadvantage of existing assembly lines is that changes in the conveyor systems are often involved (for example from floor conveyors to suspended conveyors), which necessitate a transfer station.

Another problem with assembly lines of this kind is that the overhead conveyance of vehicles terminates, at the latest, before the end of the assembly line, where the vehicle undergoes final testing. Because the automatic transport for the vehicle terminates before the area in which the assembly line ends, the vehicles have to be driven from one test rig to the next by an employee; this is not only manpower-intensive, but also produces noxious emissions that have to be extracted at high cost. An additional disadvantage, for example in roller test rigs, is that because the tires are already fitted on the vehicles and could be damaged during testing on the roller test rig, limitations exist for roller test rigs in respect of maximum wheel speed and the kind of tires (for example, no winter tires).

The object of the invention is thus to provide a device for the assembly of motor vehicles, which may be installed anywhere in a flat hall without modifying the ceiling or floor and is transportable.

This object is established by assembling the device from individual, transportable, modular, interconnectable components that can be installed on a flat surface without using pits or creating floor load, said device encompassing the conveying mechanisms and assembly units for the motor vehicles to be assembled.

The individual components in this case are self-contained, integrated functional units that are standardized and optimized. They are delivered if possible as completely pre-equipped and pre-tested units and are then connected up to the overall system via their standard interfaces (docking sites). With a device of this kind it is possible, at short notice and without structural modifications to the assembly hall (no suspension, therefore no reinforcement of ceiling statics and no hung steel constructions necessary—at floor level, therefore no provision of pits necessary), to put together an assembly line comprising individual, modular, standardized components or to transport an assembly line of this kind from one assembly hall to another (or over greater distances, e.g. from one plant to another). It is thus possible, in a very short time, to combine completely pre-equipped and tested modules (in respect of power supplies, data transmission, lighting, handling, conveyance, workplace equipment, logistics, Andon and Poka-Yoke) to an assembly line, or to extend or divide the assembly line, without the need for any structural measures.

To this end, it is expedient if the individual components are of a size that still allows transport over greater distances (road transport). A modular system of this kind significantly increases production flexibility, permitting rapid installation (or modification in the event of a model switch) of an assembly line made up of individual, pre-equipped components that need only be coupled together. Such an assembly line can be installed anywhere in the factory without special requirements in respect of the ceiling statics or the presence of pits.

In other words, a complete, modular factory is created, which encompasses the materials handling technology, the workstations, the end of the conveyor line, the assembly of units, transport and installation of vehicle modules (doors, cockpit, engines, seats, front end, wheels, etc.) as well as employee-related equipment and logistics. This results in great flexibility: while assembly processes can always be adapted flexibly to suit product requirements, conveyor restrictions (e.g. a system change), pit restrictions (e.g. at the "marriage", or joining of body and engine block) and building restrictions (e.g. with respect to statics and floor-space requirements) are eliminated. The time required to set up an assembly line of this kind is also considerably less, as the modules are delivered fully equipped, no preliminary steel construction or planning and construction of pits is necessary, transfer units in the conveyor line are eliminated Oust a single conveyor system), the assembly line is of a low degree of complexity with few interfaces, and, as a result, a short planning time suffices. The fact that the assembly line is less complex means greater transparency, better overall clarity and better communication without any risk of negative effects on the quality.

One embodiment of the invention consists in the provision of coupling means for supply lines running in the individual components.

This further accelerates installation of the assembly line: if the axial supply lines (for electricity, compressed air, etc.) are automatically coupled when the individual components are coupled, the time-consuming connecting up of individual units in the assembly line to supply lines of this kind becomes unnecessary, at the same time eliminating the associated danger of a missing or incorrect connection and the risk of accidents caused by these lines.

A preferred embodiment of the invention consists in that the conveyor mechanism is a mechanism for the overhead conveyance of motor vehicles.

The means for the overhead conveyance of motor vehicles are already contained in the individual components, so that attachment of these conveying mechanisms to the ceiling of the hall is unnecessary.

According to the invention, the device encompasses a final assembly section.

In the final assembly section it is usual for the wheels to be fitted to the motor vehicle and, inter alia, for function tests to be carried out (acceleration, gear-shift, braking and light tests). These operations may also be performed within the device of the invention.

According to a preferred embodiment of the invention, the device includes a vehicle test rig in which the motor vehicle is suspended; the vehicle wheels may be set in rotation or braked by motor-driven elements of a roller, braking and ABS test rig, said elements acting upon the wheels from the side.

In this way, the motor vehicles can undergo the function tests designed to be performed in the final assembly section despite the overhead conveyance; moreover, the previously described disadvantages of roller test rigs are avoided.

According to an embodiment of the invention, the motor-driven elements act on the tires.

According to another embodiment of the invention, the motor-driven elements act on the wheel rims.

It is likewise possible for the motor-driven elements to act on the wheel hubs.

It is furthermore expedient to provide means for automatically performing acceleration and braking operations.

It is likewise expedient to provide means for automatically performing additional function tests.

These may include, for example, a vehicle shake test or a light test.

A development of the invention consists in the provision of overhead conveyance means for transporting the finished motor vehicles out of the assembly hall.

It is expedient here to provide a branch to a rework station.

The overhead conveyance means for transporting the motor vehicles out of the assembly hall has the advantage that subsequent to final assembly, the motor vehicles can be transported, while still suspended, out of the assembly hall to a parking space. This measure prevents emissions caused by starting up the motor vehicles and driving them out of the assembly hall; at the end of the overhead conveyance system, the finished motor vehicles can be parked in an orderly, automated and recordable manner. An optional branch to a rework station for still defective vehicles may be provided within the overhead conveyance system.

The invention is explained below by reference to embodiments.

FIG. 1b shows the side view of FIG. 1a;

FIG. 1b shows the side view of FIG. 2a;

FIG. 3b shows the side view of FIG. 3a;

FIG. 5b shows the side view of FIG. 5a;

Figure 1A:
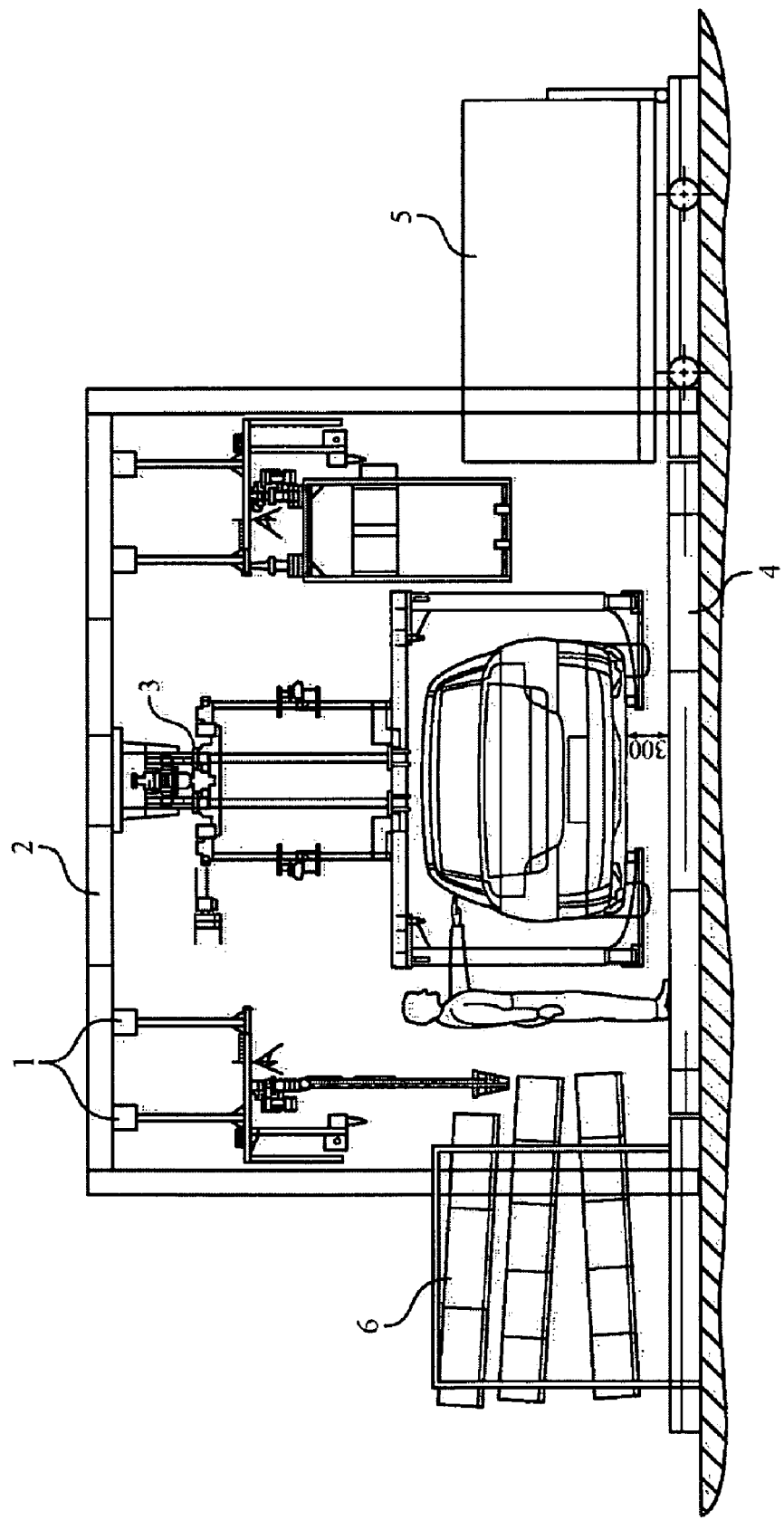
FIG. 1a shows a cross-sectional view of an individual component according to the invention.
Figure 1B:
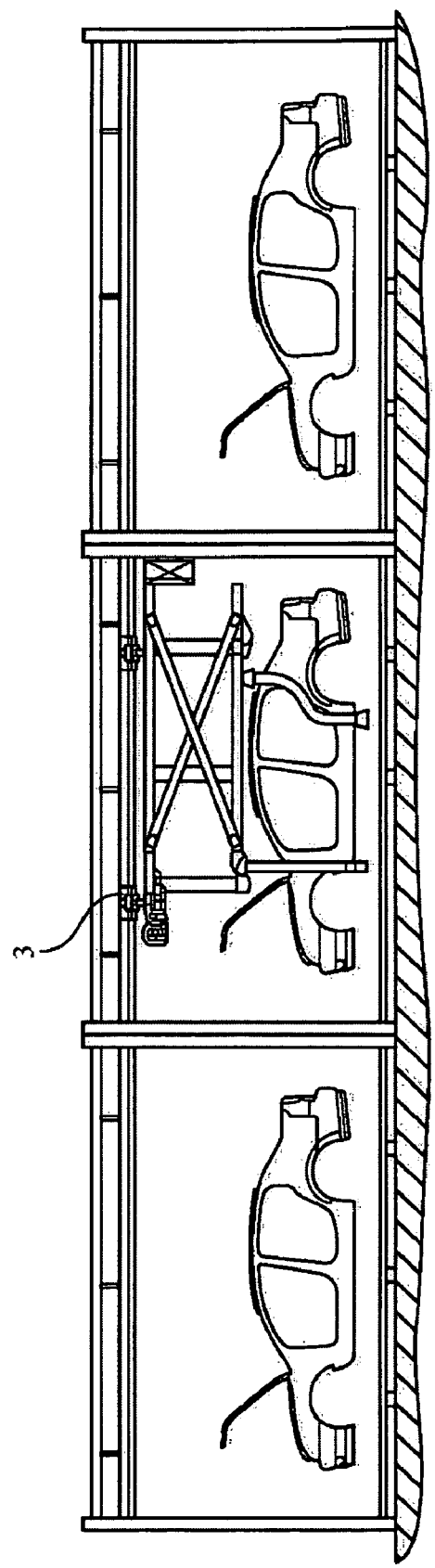

As is evident from FIG. 1a and 1b, the individual components (modular workstations) have load-bearing members in the form of longitudinal girders 1 and transverse girders 2, on which the conveying mechanisms 3 for the vehicle to be assembled, the supply lines—e.g. for electricity, data transmission, compressed air, etc.—and other equipment such as ropes for the information signs and rails for trolleys and pneumatic devices are mounted. At the coupling points between two individual components, quick-release connectors are provided that ensure the power supply from individual component to individual component. In this way, one of the individual components can be connected up to the supply lines in the hall and power then supplied to the other individual components via the quick-release connections, without the time-consuming necessity of connecting up each individual component separately. Of course, it is also possible to connect up each of the individual components separately to the supply lines.

The individual components are additionally equipped with a worker-transport belt 4, or, alternatively, a platform. Material may be supplied per materials trolley from the side, or taken from shelves 6.

Figure 2A:
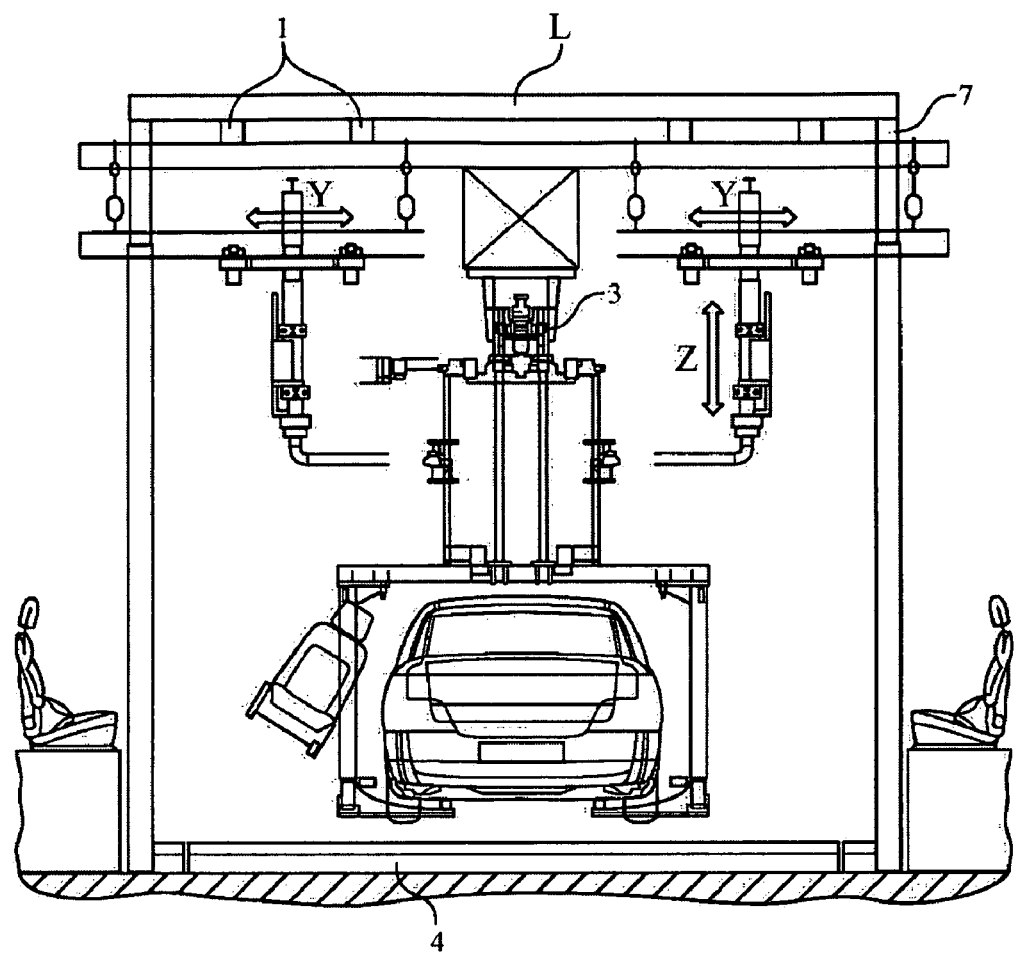
FIG. 2a shows a cross-sectional view of an individual component according to the invention at the seat-handling stage, with height adaptation means.
Figure 2B:
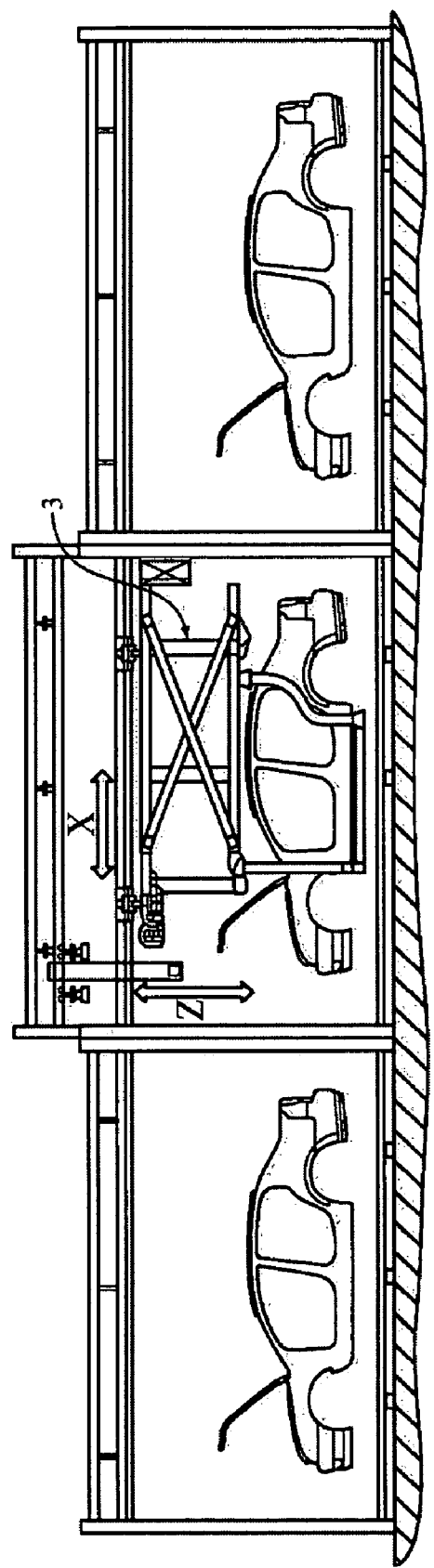

In FIGS. 2a and 2b an individual component with a height adapter 7 is illustrated, which makes it possible to reach to a height that exceeds the usual construction height. This may also be achieved by way of extra-long supports.

Figure 3A:
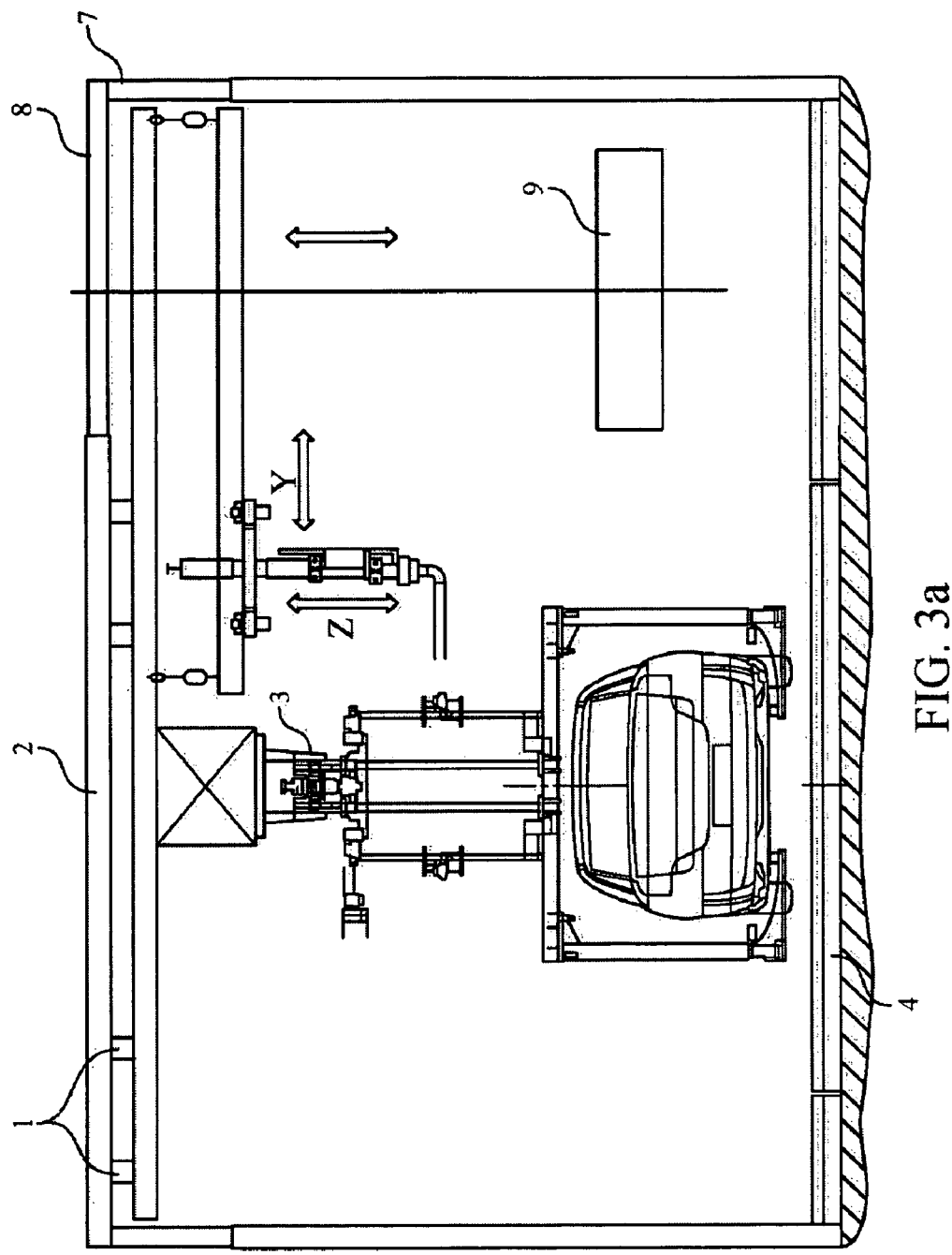
FIG. 3a shows a cross-sectional view of an individual component according to the invention with height and sideways adaptation means for cockpit handling.
Figure 3B:
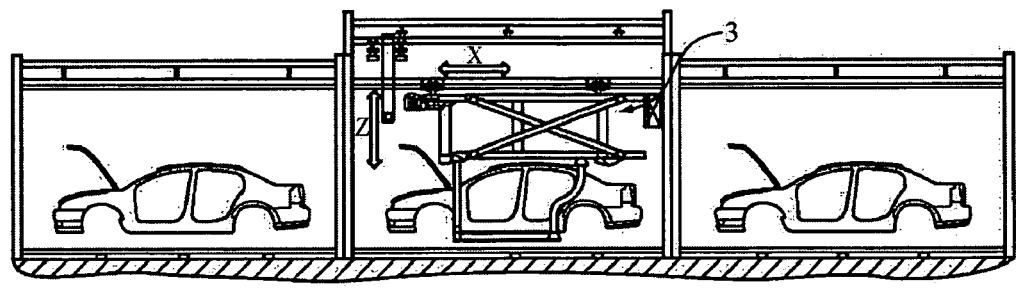
Figure 3C:
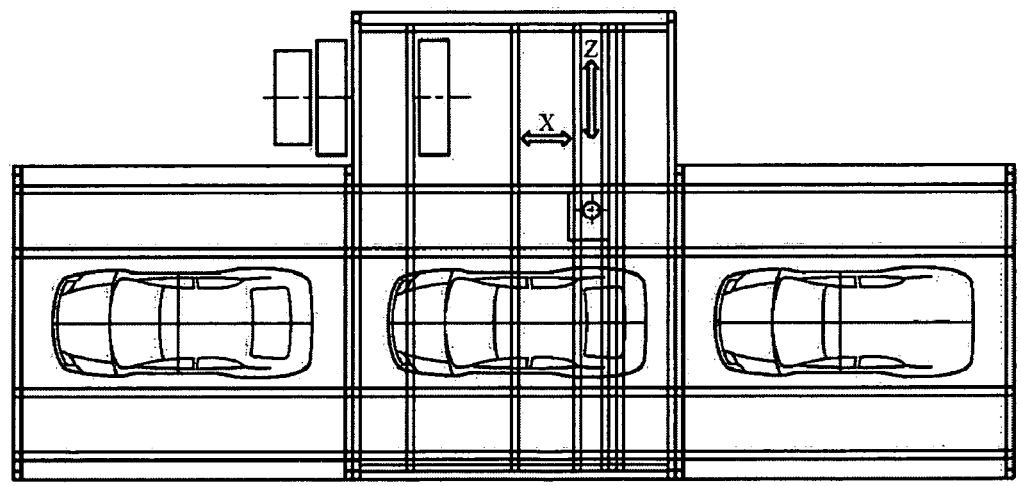
FIG. 3c shows the top view of FIGS. 3a and 3b.

In FIGS. 3a and 3b, by analogy, an individual component with a height adapter 7 and a lateral adapter 8 is illustrated, with which it is also possible to reach to a width that exceeds the usual construction width. The cockpits 9 to be fitted at this station are supplied from the side.

Figure 4:
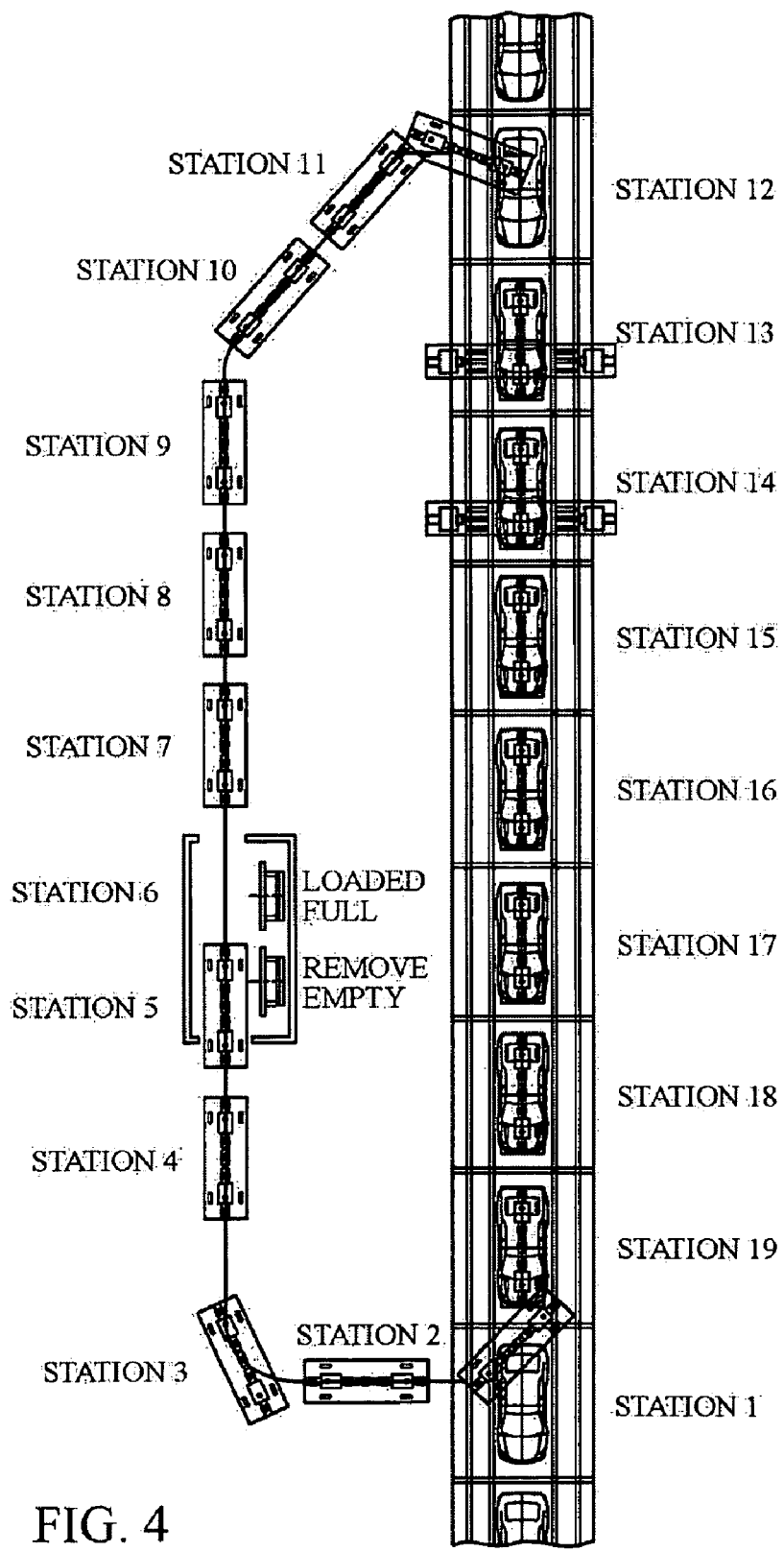
FIG. 4 shows a device according to the invention for unit assembly.
Figure 5B:
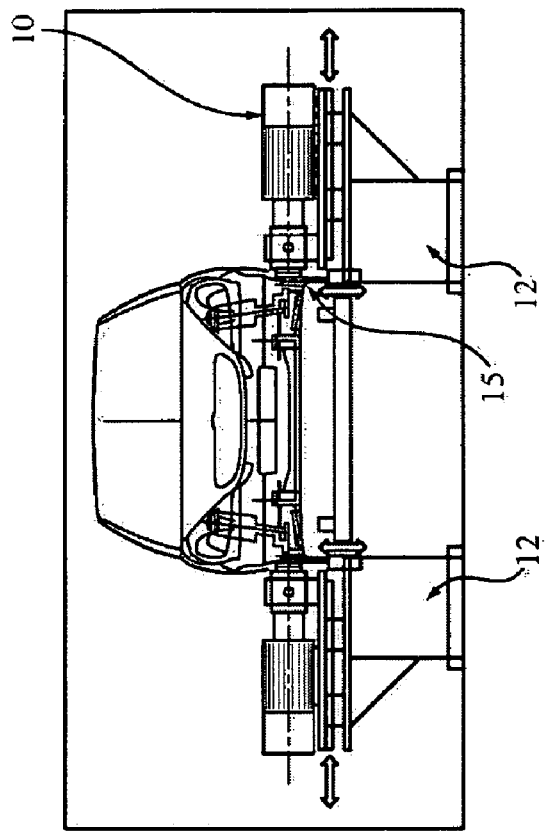
Figure 5A:
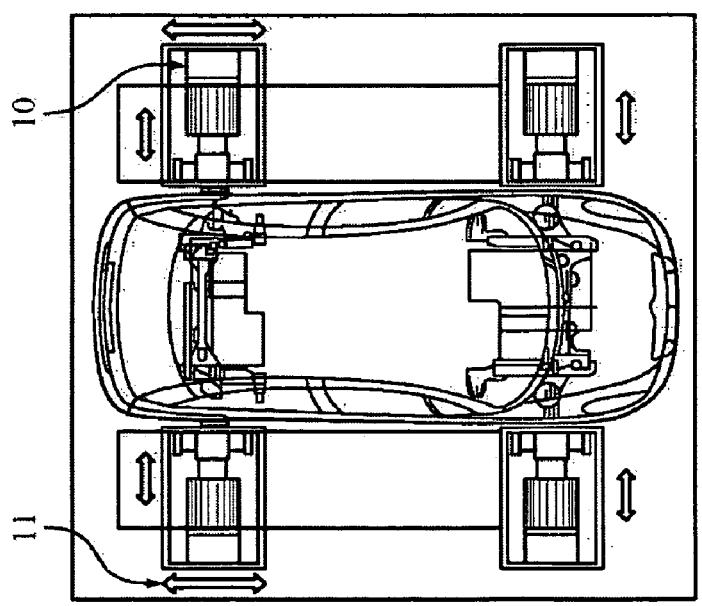
FIG. 5a shows a top view of a roller, braking and ABS test rig.
Figure 5C:
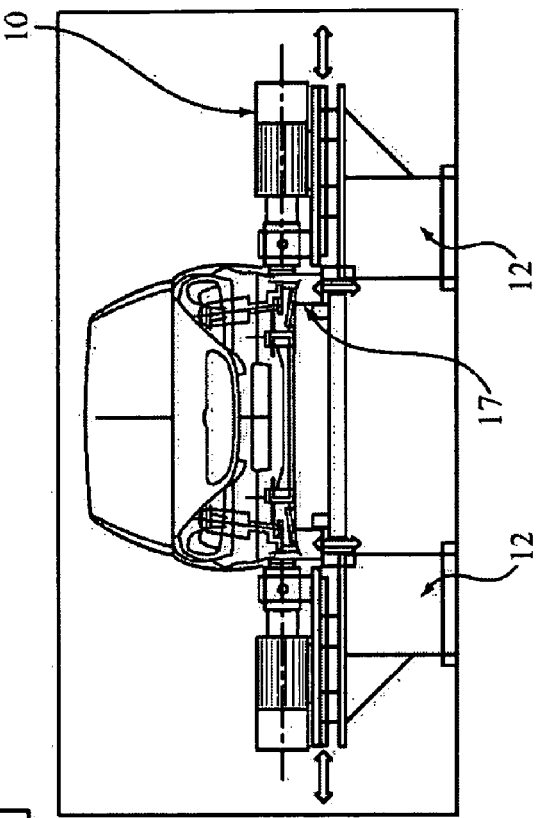
FIGS. 5c and 5d show views, similar to FIGS. 5a-5b, of a roller, braking and ABS test rig showing motor-driven elements acting on the wheel rims and the tires respectively.
Figure 5D:
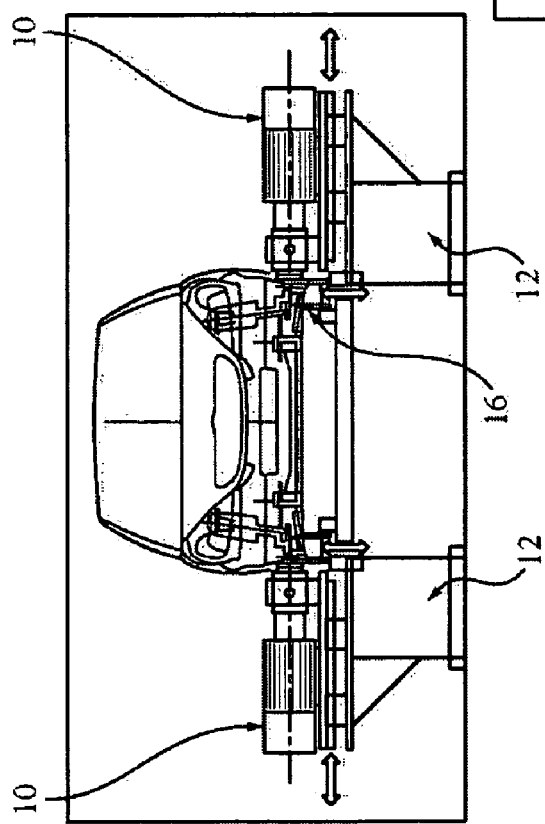

FIG. 4 shows a device according to the invention in the form of a sequence of individual components for unit assembly, the individual components being designated as stations 1 to 19.

FIGS. 5a through 5d show a roller, braking and ABS test rig (for motor vehicles being transported by an overhead conveyance system 3), where load units 10 are advanced laterally from the outside to the wheels of the motor vehicle and act on either the tires 17, the wheel rims 16 or the wheel hubs 15, as well as means 11 for adjusting the wheelbase. Additionally, beneath each load unit, vibratory units 12 are provided with which a shaking movement can be initiated.

Figure 6:
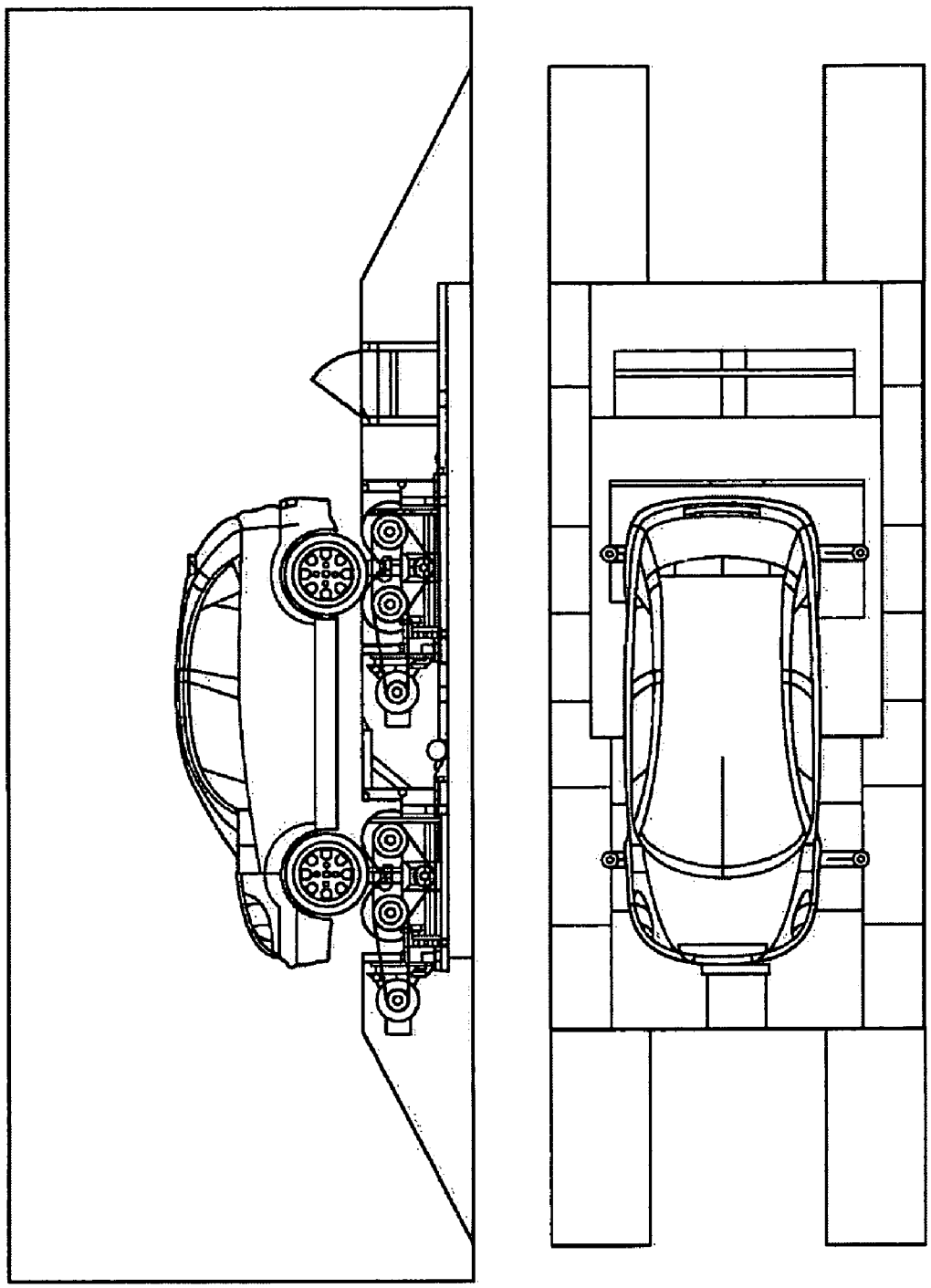
FIG. 6 shows an X-road of minimal height.
Figure 7:
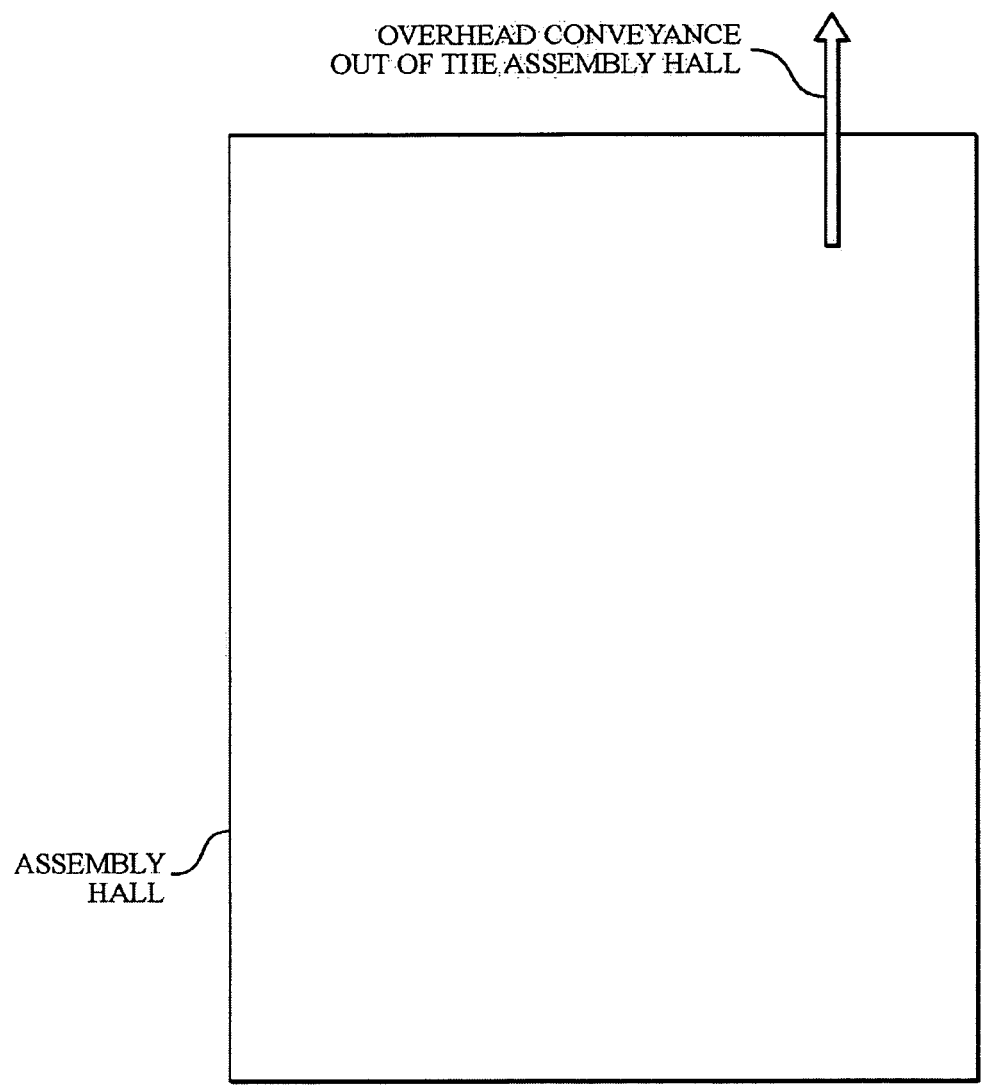
FIG. 7 shows a schematic view of an assembly hall, with a modular conveying mechanism of the device according to the present invention for overhead conveyance out of the assembly hall of a motor vehicle following assembly also schematically shown.

FIG. 6 finally, shows an X-road of minimal height.

The invention claimed is:

1. A device for assembling motor vehicles comprising:
   (a) a plurality of conveying mechanisms, said plurality of conveying mechanisms comprising a conveying mechanism for overhead conveyance of a motor vehicle following assembly out of an assembly hall; and
   (b) a plurality of assembly units for the motor vehicle; wherein the conveying mechanisms and the assembly units comprise individual, transportable, modular, interconnectable components installable on a flat surface without using a pit.

2. The device according to claim 1, further comprising a vehicle test rig comprising a plurality of motor-driven elements; the motor vehicle having vehicle wheels set in rotation or braked by said motor-driven elements acting laterally upon the wheels.

3. The device according to claim 2, wherein the motor vehicle has tires and the motor-driven elements act on the tires.

4. The device according to claim 2, wherein the motor vehicle has wheel rims and the motor-driven elements act on the wheel rims.

5. The device according to claim 2, wherein the motor vehicle has wheel hubs and the motor-driven elements act on the wheel hubs.

6. The device according to claim 1, further comprising means for automatically performing selected function tests.

* * * * *